（12） United States Patent
Cheng et al.

(10) Patent No.: US 12,422,630 B2
(45) Date of Patent: Sep. 23, 2025

(54) OPTICAL DEVICE (71) Applicant: VisEra Technologies Company Limited, Hsin-Chu (TW)

(72) Inventors: Wei-Hsun Cheng, Hsin-Chu (TW); Wei-Ko Wang, Hsin-Chu (TW); Hsin-Yi Hsieh, Hsin-Chu (TW)

(73) Assignee: VISERA TECHNOLOGIES COMPANY LIMITED, Hsin-Chu (TW)

( * ) Notice: Subject to any disclaimer, the term of this patent is extended or adjusted under 35 U.S.C. 154(b) by 435 days.

(21) Appl. No.: 17/968,134

(22) Filed: Oct. 18, 2022

(65) Prior Publication Data

US 2024/0126027 A1    Apr. 18, 2024

(51) Int. Cl.
*G02B 6/42* (2006.01)
*B01L 3/00* (2006.01)

(52) U.S. Cl.
CPC ...... G02B 6/4214 (2013.01); B01L 3/502761 (2013.01); *B01L 2200/0647* (2013.01); *B01L 2300/0654* (2013.01); *B01L 2300/0864* (2013.01); *B01L 2300/0877* (2013.01)

(58) Field of Classification Search
CPC ... G02B 6/00; G02B 6/4214; B01L 3/502761; B01L 2200/0647; B01L 2300/0654; B01L 2300/0864; B01L 2300/0877
USPC .......................................................... 385/37
See application file for complete search history.

(56) References Cited

U.S. PATENT DOCUMENTS

| 8,865,077 B2 * | 10/2014 | Chiou ................ G01N 21/6454 422/82.11 |
| 2011/0306039 A1 | 12/2011 | Chiou et al. |
| 2019/0041634 A1 * | 2/2019 | Popovich ................ G01S 17/66 |

FOREIGN PATENT DOCUMENTS

| WO | WO2018/112367 A2 | 6/2018 |
| WO | WO2021/168155 A1 | 8/2021 |

OTHER PUBLICATIONS

European Search Report dated Aug. 23, 2023 in Application No. 23157680.2 is attached, 9 pages.

* cited by examiner

*Primary Examiner* — Michael G Lee
(74) *Attorney, Agent, or Firm* — MUNCY, GEISSLER, OLDS & LOWE, P.C.

(57) ABSTRACT

An optical device is provided. The optical device includes a substrate, a waveguide layer, a first input grating, a first fold grating, and an isolation layer. The waveguide layer is disposed on the substrate. The first input grating is disposed in the waveguide layer. A first incident light passes through the first input grating to form a first light. The first fold grating is disposed in the waveguide layer. The first light passes through the first fold grating to form a first diffracted light in a first direction and a second diffracted light in a second direction. The isolation layer includes a first well array and is disposed on the waveguide layer. When the first diffracted light in the first direction travels to a first top portion corresponding to the first well array of the waveguide layer, the first diffracted light further passes through the first well array.

19 Claims, 5 Drawing Sheets

OPTICAL DEVICE

BACKGROUND OF THE INVENTION

Field of the Invention

The invention relates to an optical device, and more particularly to an optical device with a fold grating for bio-detections.

Description of the Related Art

A coupling-in grating can be used to introduce light into a small chip. This can be used in applications requiring optical detection, such as DNA sequencing, point-of-care detection, and micro/nanoarrays, while embedded the light guiding layer into the detection chip under the biosample immobilization layer. To increase the light density for sufficient energy to excite fluorophores, the light needs to be guided into each channel under the biosample array, and then a Y-branch splitter is introduced. However, the Y-branch splitter takes up a lot of space in the chip to guide an input light to hundreds or thousands of channel light guides/waveguides.

BRIEF SUMMARY OF THE INVENTION

In accordance with one embodiment of the invention, an optical device is provided. The optical device includes a substrate, a waveguide layer, a first input grating, a first fold grating and an isolation layer. The waveguide layer is disposed on the substrate. The first input grating is disposed in the waveguide layer. A first incident light passes through the first input grating to form a first light. The first fold grating is disposed in the waveguide layer. The first light passes through the first fold grating to form a first diffracted light in a first direction and a second diffracted light in a second direction, and the first direction is different from the second direction. The isolation layer includes a first well array. The isolation layer is disposed on the waveguide layer. When the first diffracted light in the first direction travels to a first top portion corresponding to the first well array of the waveguide layer, the first diffracted light further passes through the first well array.

In some embodiments, the refractive index of the waveguide layer is greater than that of the substrate. In some embodiments, the refractive index of the waveguide layer is between 1.4 and 3.8.

In some embodiments, the period of the first input grating is in a range from 0.1 μm to 2 μm.

In some embodiments, the first fold grating includes a binary grating, a slanted grating, or a blazed grating. In some embodiments, the first fold grating is disposed in the top position of the waveguide layer. In some embodiments, the first fold grating is disposed in the bottom position of the waveguide layer. In some embodiments, the period of the first fold grating is in a range from 0.1 μm to 2 μm. In some embodiments, the smallest width of the first fold grating is the diameter of the spot of the first light. In some embodiments, the diameter of the spot of the first light is between 1 μm and 10 mm.

In some embodiments, the first diffracted light includes 2 to $10^6$ beams.

In some embodiments, the wavelength of the first incident light is in a range from 380 nm to 1,000 nm.

In some embodiments, when the thickness of the waveguide layer is greater than the critical thickness, the wells of the first well array are located in predetermined positions in the isolation layer. In some embodiments, when the thickness of the waveguide layer is smaller than the critical thickness, the wells of the first well array are located in random positions in the isolation layer.

In some embodiments, the angle between the extension direction of the first input grating and the extension direction of the first fold grating is equal to a, and the angle α is greater than 15 degrees and smaller than 75 degrees. In some embodiments, the period of the first fold grating is equal to the period of the first input grating multiplied by cos α.

In some embodiments, the first well array includes a plurality of nano-scale or micro-scale wells loaded with fluorophore-labelled biomolecules (i.e. biomolecules with fluorescent tags). In some embodiments, the well includes an opening. The opening is between 50 nm and 1 mm, and it may be round or square when seen from the top view.

In some embodiments, the isolation layer is made of metal or dielectric materials.

In some embodiments, the optical device also includes a second fold grating disposed in the waveguide layer on one side of the first input grating relative to the first fold grating. The first incident light passes through the first input grating to form a second light. The second light passes through the second fold grating to form a third diffracted light in a third direction and a fourth diffracted light in a fourth direction. The third direction is different from the fourth direction. When the third diffracted light in the third direction travels to a second top portion corresponding to a second well array of the waveguide layer, the third diffracted light further passes through the second well array.

In some embodiments, the optical device also includes a second input grating and a second fold grating which are disposed in the waveguide layer. A second incident light passes through the second input grating to form a second light. The second light passes through the second fold grating to form a third diffracted light in a third direction and a fourth diffracted light in a fourth direction. The third direction is different from the fourth direction. When the third diffracted light in the third direction travels to the first top portion corresponding to the first well array of the waveguide layer, the third diffracted light further passes through the first well array. In some embodiments, the first diffracted light of the first light passing through the first well array intersects with the third diffracted light of the second light passing through the first well array.

In some embodiments, the optical device also includes a third input grating and a third fold grating which are disposed in the waveguide layer. A third incident light passes through the third input grating to form a third light. The third light passes through the third fold grating to form a fifth diffracted light in a fifth direction and a sixth diffracted light in a sixth direction. The fifth direction is different from the sixth direction. When the fifth diffracted light in the fifth direction travels to the first top portion corresponding to the first well array of the waveguide layer, the fifth diffracted light further passes through the first well array. In some embodiments, the first diffracted light of the first light passing through the first well array intersects with the third diffracted light of the second light passing through the first well array and the fifth diffracted light of the third light passing through the first well array.

In some embodiments, the optical device also includes a fourth input grating and a fourth fold grating which are disposed in the waveguide layer. A fourth incident light passes through the fourth input grating to form a fourth light. The fourth light passes through the fourth fold grating to form a seventh diffracted light in a seventh direction and an eighth diffracted light in an eighth direction. The seventh direction is different from the eighth direction. When the seventh diffracted light in the seventh direction travels to the first top portion corresponding to the first well array of the waveguide layer, the seventh diffracted light further passes through the first well array. In some embodiments, the first diffracted light of the first light passing through the first well array intersects with the third diffracted light of the second light passing through the first well array, the fifth diffracted light of the third light passing through the first well array, and the seventh diffracted light of the fourth light passing through the first well array.

The present invention provides a bio-detection device using at least one fold grating on a planar waveguide layer to equally split excitation energy for the detection of fluorescence molecules in the reaction sites. The device provided by the present invention needs a short width to include a fold grating for equally splitting excitation energy into the waveguide layer. In addition, the biomolecules with fluorescent tags to be detected loaded in each well are excited by light of different wavelengths (for example, two, three or four wavelengths of light) to produce different fluorescence.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The optical device of the present invention is described in detail in the following description. In the following detailed description, for purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept may be embodied in various forms without being limited to those exemplary embodiments. In addition, the drawings of different embodiments may use like and/or corresponding numerals to denote like and/or corresponding elements in order to clearly describe the present disclosure. However, the use of like and/or corresponding numerals in the drawings of different embodiments does not suggest any correlation between different embodiments. In addition, in this specification, expressions such as "first material layer disposed on/over a second material layer", may indicate the direct contact of the first material layer and the second material layer, or it may indicate a non-contact state with one or more intermediate layers between the first material layer and the second material layer. In the above situation, the first material layer may not be in direct contact with the second material layer.

In addition, in this specification, relative expressions are used. For example, "lower", "bottom", "higher" or "top" are used to describe the position of one element relative to another. It should be appreciated that if a device is flipped upside down, an element that is "lower" will become an element that is "higher".

Unless defined otherwise, all technical and scientific terms used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined.

In the description, relative terms such as "lower", "upper", "horizontal", "vertical", "above", "below", "up", "down", "top" and "bottom" as well as derivative thereof (e.g., "horizontally", "downwardly", "upwardly", etc.) should be construed as referring to the orientation as described or as shown in the drawing under discussion. These relative terms are for convenience of description and do not require that the apparatus be constructed or operated in a particular orientation. Terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

It should be understood that, although the terms first, second, third etc. may be used herein to describe various elements, components, regions, layers, portions and/or sections, these elements, components, regions, layers, portions and/or sections should not be limited by these terms. These terms are only used to distinguish one element, component, region, layer, portion or section from another element, component, region, layer or section. Thus, a first element, component, region, layer, portion or section discussed below could be termed a second element, component, region, layer, portion or section without departing from the teachings of the present disclosure.

Herein, the terms "about", "around" and "substantially" typically mean +/−20% of the stated value or range, typically +/−10% of the stated value or range, typically +/−5% of the stated value or range, typically +/−3% of the stated value or range, typically +/−2% of the stated value or range, typically +/−1% of the stated value or range, and typically +/−0.5% of the stated value or range. The stated value of the present disclosure is an approximate value. Namely, the meaning of "about", "around" and "substantially" may be implied if there is no specific description of "about", "around" and "substantially".

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
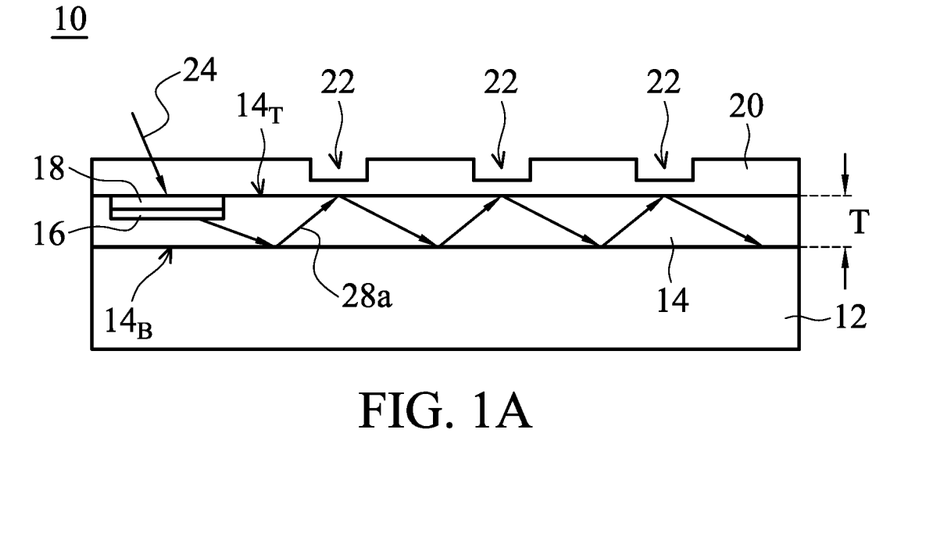
FIG. 1A shows a cross-sectional view of an optical device in accordance with one embodiment of the present invention.
Figure 1B:
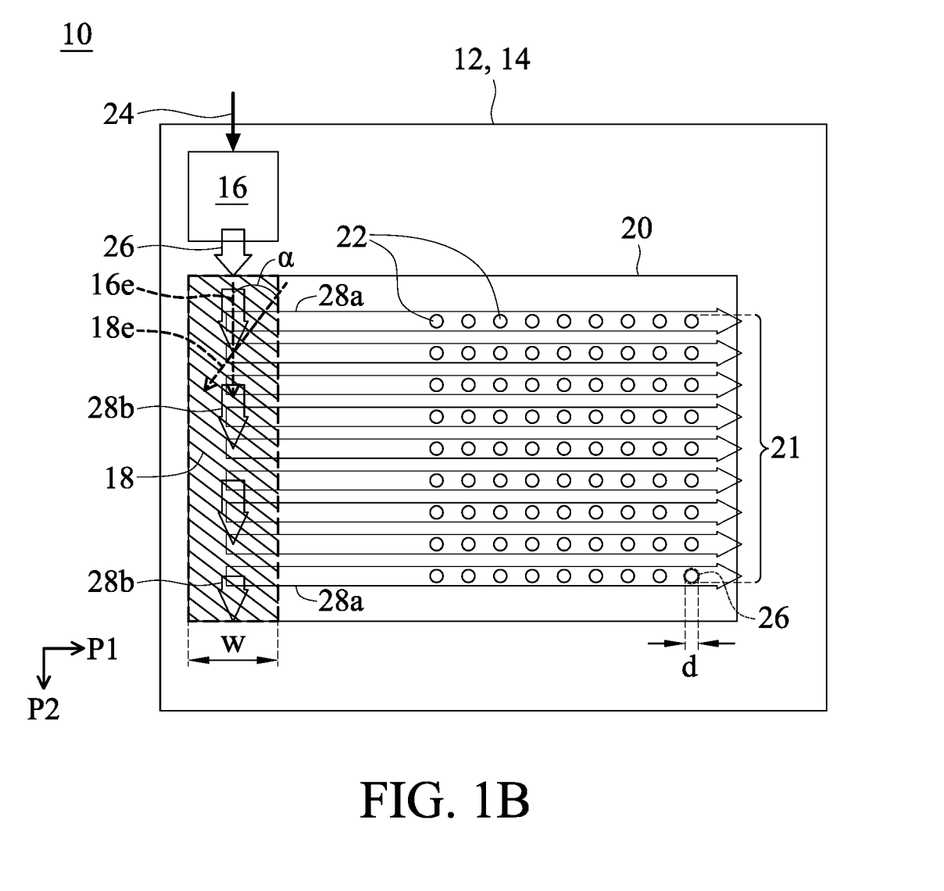
FIG. 1B shows a top view of an optical device in accordance with one embodiment of the present invention.

Referring to FIGS. 1A and 1, in accordance with one embodiment of the present invention, an optical device 10 is provided. FIG. 1A shows a cross-sectional view of the optical device 10. FIG. 1B shows a top view of the optical device 10.

As shown in FIG. 1A, the optical device 10 includes a substrate 12, a waveguide layer 14, an input grating 16, a fold grating 18 and an isolation layer 20. The waveguide layer 14 is disposed on the substrate 12. The input grating 16 is disposed in the waveguide layer 14. The fold grating 18 is disposed in the waveguide layer 14. The isolation layer 20 includes a well array 21 including a plurality of wells 22 and is disposed on the waveguide layer 14.

Referring to FIGS. 1B and 1A, a light path in the optical device 10 is further illustrated as follows. An incident light 24 passes through the input grating 16 to form a light 26. The incident light 24 enters the input grating 16 perpendicularly or at a proper angle of incidence. The light 26 passes through the fold grating 18 to form a first diffracted light 28a in a first direction P1 and a second diffracted light 28b in a second direction P2. The first direction P1 is different from the second direction P2. When the first diffracted light 28a in the first direction P1 travels to a top portion corresponding to the well array 21 of the waveguide layer 14, the first diffracted light 28a further passes through the wells 22 of the well array 21. The first diffracted light 28a produces evanescent waves through the wells 22. The evanescent waves excite biomolecules with fluorescent tags (not shown) loaded in the wells 22 to emit fluorescence light. In some embodiments, the wavelength of the incident light 24 is in a range from about 380 nm to about 1,000 nm (i.e. from visible light to near infrared). In some embodiments, the light 26 may be a negative-first-order transmitted light. In some embodiments, the first diffracted light 28a in the first direction P1 may be a positive-first-order diffracted light. The second diffracted light 28b in the second direction P2 may be a zero-order diffracted light.

In some embodiments, the substrate 12 may include a rigid substrate or a flexible substrate, for example, a glass substrate or a polyimide (PI) substrate.

In some embodiments, the refractive index of the waveguide layer 14 may be greater than that of the substrate 12. In some embodiments, the refractive index of the waveguide layer 14 is between 1.4 and 3.8.

In some embodiments, the period of the input grating 16 is in a range from about 0.1 μm to about 2 μm. For example, when the wavelength of the incident light 24 is about 532 nm, the period of the input grating 16 is about 300 nm.

In some embodiments, the fold grating 18 may include a binary grating, a slanted grating, or a blazed grating. In some embodiments, the fold grating 18 may be disposed in the top position $14_T$ of the waveguide layer 14, as shown in FIG. 1A. In some embodiments, the fold grating (not shown) may be disposed in the bottom position $14_B$ of the waveguide layer 14. In some embodiments, the period of the fold grating 18 is in a range from about 0.1 μm to about 2 μm. For example, when the wavelength of the incident light 24 is about 532 nm, the period of the fold grating 18 is about 212 nm. In some embodiments, the smallest width w (as shown in FIG. 1B) of the fold grating 18 is the diameter of the spot (not shown) of the light 26. In some embodiments, the diameter of the spot of the light 26 is in a range from about 1 μm to about 10 mm.

In some embodiments, the first diffracted light 28a of the light 26 may include 2 to $10^6$ beams.

In some embodiments, when the thickness T (as shown in FIG. 1A) of the waveguide layer 14 is greater than the critical thickness, since light travels in a predetermined direction in the waveguide layer 14, the wells 22 of the well array 21 are located in predetermined positions in the isolation layer 20 to allow the light to pass through the wells 22. For example, when the thickness T of the waveguide layer 14 is greater than 500 nm, the wells 22 of the well array 21 are located in predetermined positions in the isolation layer 20. In some embodiments, when the thickness T of the waveguide layer 14 is smaller than the critical thickness, since light is evenly distributed in the waveguide layer 14, the wells 22 of the well array 21 are located in random positions in the isolation layer 20. In this situation, the light can also pass through the wells 22. For example, when the thickness T of the waveguide layer 14 is smaller than 200 nm, the wells 22 of the well array 21 are located in random positions in the isolation layer 20. The critical thickness is decided by the maximum thickness of the waveguide layer 14 where there is single mode propagation.

In some embodiments, the angle between the extension direction 16e of the input grating 16 and the extension direction 18e of the fold grating 18 is defined by angle α (i.e. the rotation angle of the fold grating 18). In some embodiments, the angle α is an acute angle ranging from 15 degrees to 75 degrees. For example, the angle α is about 45 degrees. In some embodiments, the period of the fold grating 18 is equal to the period of the input grating 16 multiplied by cos α.

In some embodiments, the well array 21 includes a plurality of nano-scale or micro-scale wells 22 loaded with biomolecules with fluorescent tags (not shown). The bottom of the well 22 may be modified with chemical reagents that can immobilize biomolecules. The well 22 includes an opening 26. In some embodiments, the opening 26 may be round when seen from the top view, as shown in FIG. 1B. In some embodiments, the size of the opening 26 is in a range from about 50 nm to about 1 mm. For example, the diameter d of the opening 26 is in a range from about 50 nm to about 1 mm. In some embodiments, the opening 26 may be square from the top view. For example, the length or width of the opening 26 is in a range from about 50 nm to about 1 mm.

In some embodiments, the isolation layer 20 may include metal materials such as titanium (Ti), aluminum (Al), tungsten (W), gold (Au), silver (Ag), palladium (Pd), germanium (Ge), nickel (Ni), molybdenum (Mo) or platinum (Pt). In some embodiments, the isolation layer 20 may include dielectric materials such as silicon oxide, silicon nitride or silicon oxynitride.

Figure 2:
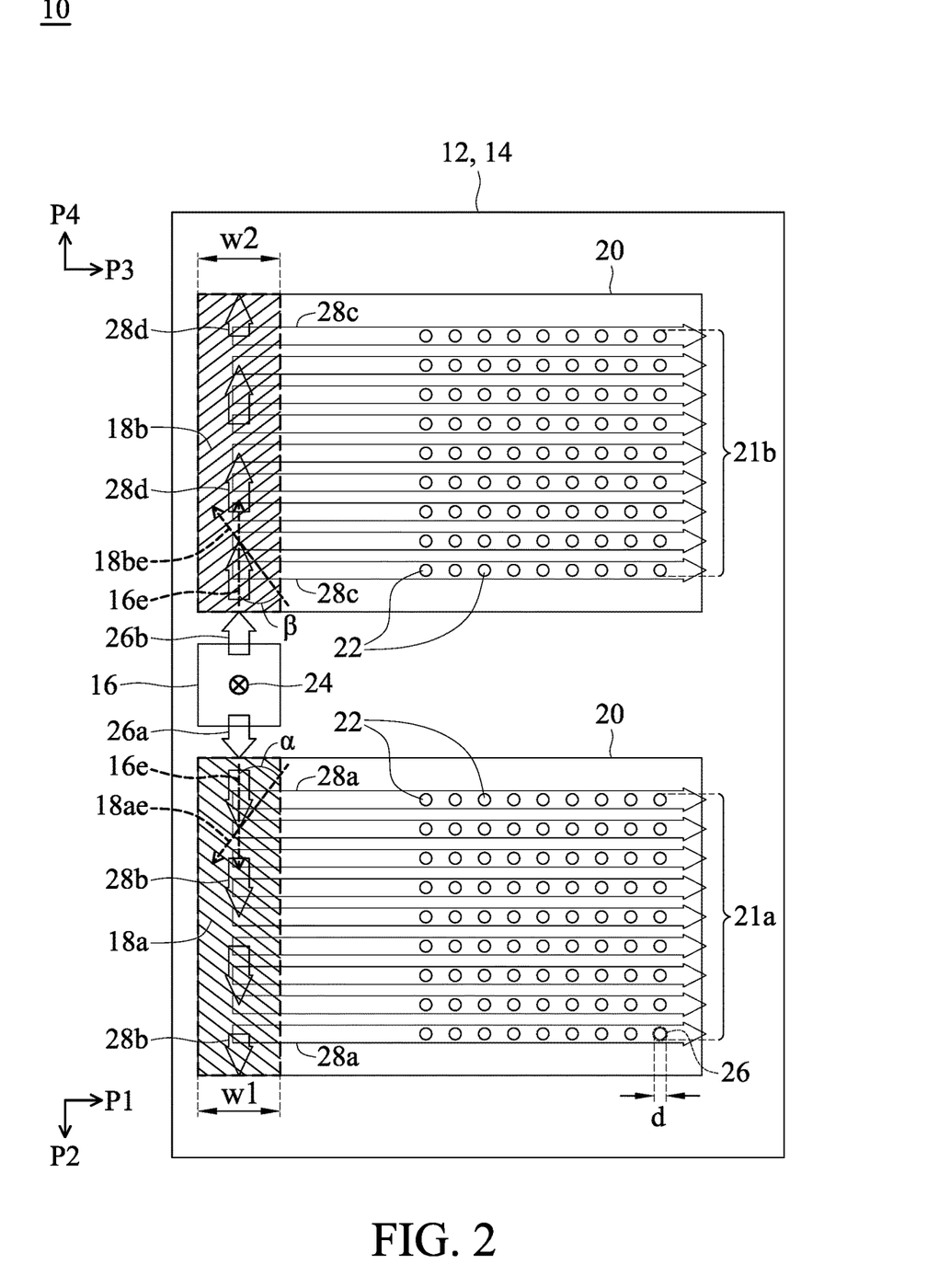
FIG. 2 shows a top view of an optical device in accordance with one embodiment of the present invention.

Referring to FIG. 2, in accordance with one embodiment of the present invention, an optical device 10 is provided. FIG. 2 shows a top view of the optical device 10. In the optical device 10, a substrate 12, a waveguide layer 14 and an isolation layer 20 are stacked like FIG. 1A, so that the cross-sectional view of the optical device 10 is omitted here.

As shown in FIG. 2, the optical device 10 includes a substrate 12, a waveguide layer 14, an input grating 16, a first fold grating 18a, a second fold grating 18b and an isolation layer 20. The waveguide layer 14 is disposed on the substrate 12. The input grating 16 is disposed in the waveguide layer 14. The first fold grating 18a and the second fold grating 18b are disposed in the waveguide layer 14. The second fold grating 18b is disposed on one side of the input grating 16 relative to the first fold grating 18a. The isolation layer 20 is disposed on the waveguide layer 14. The isolation layer 20 includes a first well array 21a including a plurality of wells 22 and a second well array 21b including a plurality of wells 22.

As shown in FIG. 2, a light path in the optical device 10 is further illustrated as follows. An incident light 24 passes through the input grating 16 to form a first light 26a and a second light 26b. The incident light 24 enters the input grating 16 perpendicularly or at a proper angle of incidence. First, the path of the first light 26a is illustrated. The first light 26a passes through the first fold grating 18a to form a first diffracted light 28a in a first direction P1 and a second diffracted light 28b in a second direction P2. The first direction P1 is different from the second direction P2. When the first diffracted light 28a in the first direction P1 travels to a top portion corresponding to the first well array 21a of the waveguide layer 14, the first diffracted light 28a further passes through the wells 22 of the first well array 21a. The first diffracted light 28a produces evanescent waves through the wells 22 of the first well array 21a. The evanescent waves excite biomolecules with fluorescent tags (not shown) loaded in the wells 22 of the first well array 21a to emit fluorescence light. In some embodiments, the wavelength of the incident light 24 is in a range from about 380 nm to about 1,000 nm (i.e. from visible light to near infrared). In some embodiments, the first light 26a may be a negative-first-order transmitted light. In some embodiments, the first diffracted light 28a in the first direction P1 may be a positive-first-order reflected light. The second diffracted light 28b in the second direction P2 may be a zero-order reflected light.

Then, the path of the second light 26b is illustrated. The second light 26b passes through the second fold grating 18b to form a third diffracted light 28c in a third direction P3 and a fourth diffracted light 28d in a fourth direction P4. The third direction P3 is different from the fourth direction P4. When the third diffracted light 28c in the third direction P3 travels to a top portion corresponding to the second well array 21b of the waveguide layer 14, the third diffracted light 28c further passes through the wells 22 of the second well array 21b. The third diffracted light 28c produces evanescent waves through the wells 22 of the second well array 21b. The evanescent waves excite biomolecules with fluorescent tags (not shown) loaded in the wells 22 of the second well array 21b to emit fluorescence light. In some embodiments, the second light 26b may be a positive-first-order transmitted light. In some embodiments, the third diffracted light 28c in the third direction P3 may be a negative-first-order reflected light. The fourth diffracted light 28d in the fourth direction P4 may be a zero-order reflected light.

In some embodiments, the substrate 12 may include a rigid substrate or a flexible substrate, for example, a glass substrate or a polyimide (PI) substrate.

In some embodiments, the refractive index of the waveguide layer 14 may be greater than that of the substrate 12. In some embodiments, the refractive index of the waveguide layer 14 is between 1.4 and 3.8.

In some embodiments, the period of the input grating 16 is in a range from about 0.1 μm to about 2 μm. For example, when the wavelength of the incident light 24 is about 532 nm, the period of the input grating 16 is about 300 nm.

In some embodiments, the first fold grating 18a and the second fold grating 18b may include a binary grating, a slanted grating, or a blazed grating. In some embodiments, the first fold grating 18a and the second fold grating 18b may be disposed in the top position of the waveguide layer 14. In some embodiments, the first fold grating 18a and the second fold grating 18b may be disposed in the bottom position of the waveguide layer 14. In some embodiments, the period of the first fold grating 18a and the second fold grating 18b is in a range from about 0.1 μm to about 2 μm. For example, when the wavelength of the incident light 24 is about 532 nm, the period of the first fold grating 18a and the second fold grating 18b is about 212 nm. In some embodiments, the smallest width w1 of the first fold grating 18a is equal to the diameter of the spot (not shown) of the first light 26a. In some embodiments, the diameter of the spot of the first light 26a is in a range from about 1 μm to about 10 mm. In some embodiments, the smallest width w2 of the second fold grating 18b is equal to the diameter of the spot (not shown) of the second light 26b. In some embodiments, the diameter of the spot of the second light 26b is in a range from about 1 μm to about 10 mm.

In some embodiments, the first diffracted light 28a of the first light 26a may include 2 to $10^6$ beams. In some embodiments, the third diffracted light 28c of the second light 26b may include 2 to $10^6$ beams.

In some embodiments, when the thickness of the waveguide layer 14 is greater than the critical thickness, since light travels in a predetermined direction in the waveguide layer 14, the wells 22 of the first well array 21a and the second well array 21b are located in predetermined positions in the isolation layer 20 to allow the light to pass through the wells 22 of the first well array 21a and the second well array 21b. For example, when the thickness of the waveguide layer 14 is greater than 500 nm, the wells 22 of the first well array 21a and the second well array 21b are located in predetermined positions in the isolation layer 20. In some embodiments, when the thickness of the waveguide layer 14 is smaller than the critical thickness, since light is evenly distributed in the waveguide layer 14, the wells 22 of the first well array 21a and the second well array 21b are located in random positions in the isolation layer 20. In this situation, the light can also pass through the wells 22 of first well array 21a and the second well array 21b. For example, when the thickness of the waveguide layer 14 is smaller than 200 nm, the wells 22 of the first well array 21a and the second well array 21b are located in random positions in the isolation layer 20. The critical thickness is decided by the maximum thickness of the waveguide layer 14 where there is single mode propagation.

In some embodiments, the angle between the extension direction 16e of the input grating 16 and the extension direction 18ae of the first fold grating 18a is defined by angle α (i.e. the rotation angle of the first fold grating 18a). In some embodiments, the angle α is an acute angle ranging from 15 degrees to 75 degrees. For example, the angle α is about 45 degrees. In some embodiments, the period of the first fold grating 18a is equal to the period of the input grating 16 multiplied by cos α.

In some embodiments, the angle between the extension direction 16e of the input grating 16 and the extension direction 18be of the second fold grating 18b is defined by angle β (i.e. the rotation angle of the second fold grating 18b). In some embodiments, the angle β is an acute angle ranging from 15 degrees to 75 degrees. For example, the angle β is about 45 degrees. In some embodiments, the period of the second fold grating 18b is equal to the period of the input grating 16 multiplied by cos β. The period, depth, shape (profile), and rotation angle of the first fold grating 18a and the second fold grating 18b are the same in some embodiments and different in others.

In some embodiments, the first well array 21a and the second well array 21b include a plurality of nano-scale or micro-scale wells 22 loaded with biomolecules with fluorescent tags (not shown). The bottom of the well 22 may be modified with chemical reagents that can immobilize biomolecules. The well 22 of the first well array 21a or the second well array 21b includes an opening 26. In some embodiments, the opening 26 may be round from the top view, as shown in FIG. 2. In some embodiments, the size of the opening 26 is in a range from about 50 nm to about 1 mm. For example, the diameter d of the opening 26 is in a range from about 50 nm to about 1 mm. In some embodiments, the opening 26 may be square from the top view. The length or width of the opening 26 is in a range from about 50 nm to about 1 mm.

In some embodiments, the isolation layer 20 may include metal materials such as titanium (Ti), aluminum (Al), tungsten (W), gold (Au), silver (Ag), palladium (Pd), germanium (Ge), nickel (Ni), molybdenum (Mo) or platinum (Pt). In some embodiments, the isolation layer 20 may include dielectric materials such as silicon oxide, silicon nitride or silicon oxynitride.

Figure 3:
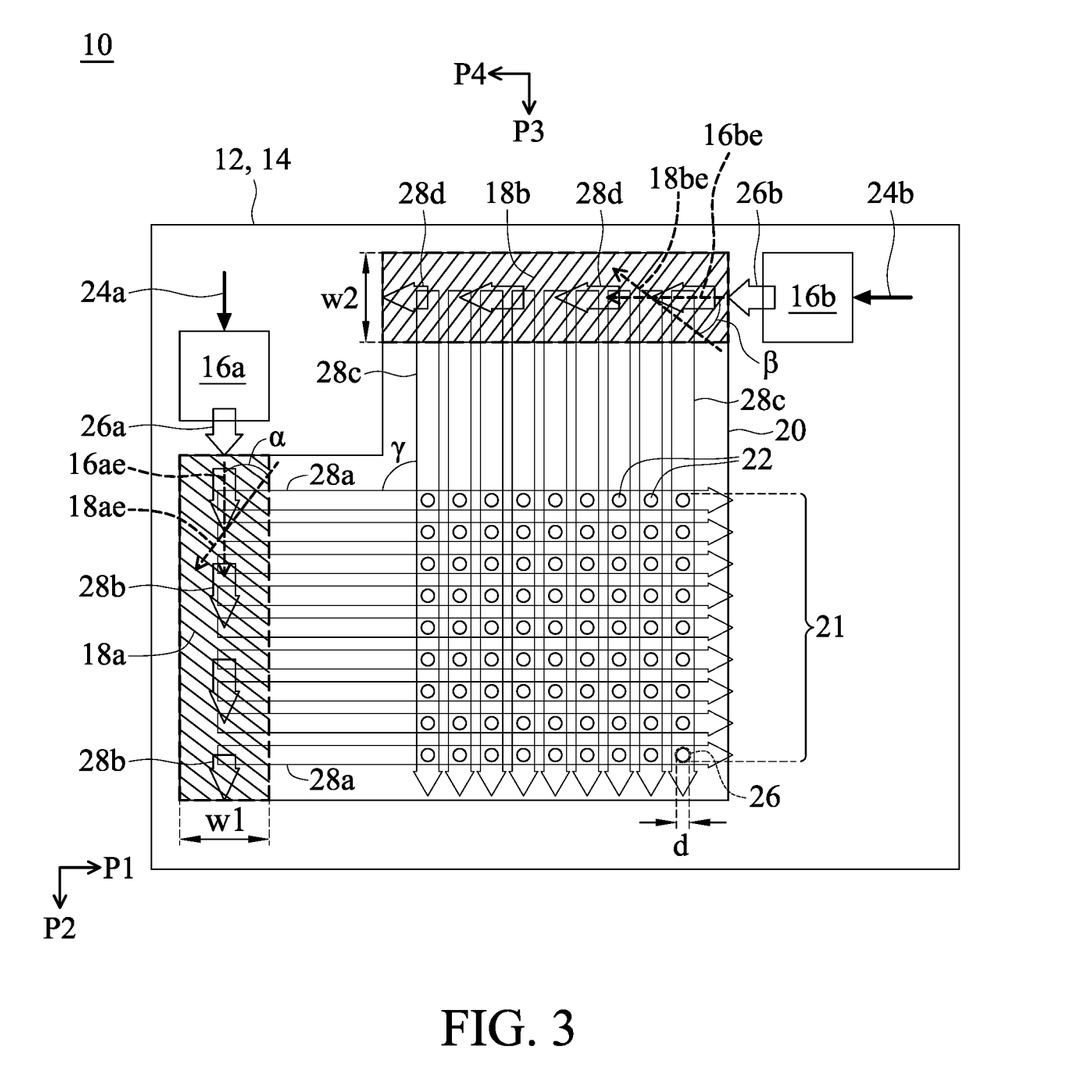
FIG. 3 shows a top view of an optical device in accordance with one embodiment of the present invention.

Referring to FIG. 3, in accordance with one embodiment of the present invention, an optical device 10 is provided. FIG. 3 shows a top view of the optical device 10. In the optical device 10, a substrate 12, a waveguide layer 14 and an isolation layer 20 are stacked like FIG. 1A, so that the cross-sectional view of the optical device 10 is omitted here.

As shown in FIG. 3, the optical device 10 includes a substrate 12, a waveguide layer 14, a first input grating 16a, a second input grating 16b, a first fold grating 18a, a second fold grating 18b and an isolation layer 20. The waveguide layer 14 is disposed on the substrate 12. The first input grating 16a and the second input grating 16b are disposed in the waveguide layer 14. The first fold grating 18a and the second fold grating 18b are disposed in the waveguide layer 14. The isolation layer 20 is disposed on the waveguide layer 14. In addition, the isolation layer 20 includes a well array 21 including a plurality of wells 22.

As shown in FIG. 3, a light path in the optical device 10 is further illustrated as follows. A first incident light 24a passes through the first input grating 16a to form a first light 26a. The first incident light 24a enters the first input grating 16a perpendicularly or at a proper angle of incidence. The path of the first light 26a is illustrated. The first light 26a passes through the first fold grating 18a to form a first diffracted light 28a in a first direction P1 and a second diffracted light 28b in a second direction P2. The first direction P1 is different from the second direction P2. When the first diffracted light 28a in the first direction P1 travels to a top portion corresponding to the well array 21 of the waveguide layer 14, the first diffracted light 28a further passes through the wells 22 of the well array 21. The first diffracted light 28a produces evanescent waves through the wells 22. The evanescent waves excite biomolecules with fluorescent tags (not shown) loaded in the wells 22 to emit fluorescence light. In some embodiments, the wavelength of the first incident light 24a is in a range from about 380 nm to about 1,000 nm (i.e. from visible light to near infrared).

A second incident light 24b passes through the second input grating 16b to form a second light 26b. The second incident light 24b enters the second input grating 16b perpendicularly or at a proper angle of incidence. The path of the second light 26b is illustrated. The second light 26b passes through the second fold grating 18b to form a third diffracted light 28c in a third direction P3 and a fourth diffracted light 28d in a fourth direction P4. The third direction P3 is different from the fourth direction P4. When the third diffracted light 28c in the third direction P3 travels to the top portion corresponding to the well array 21 of the waveguide layer 14, the third diffracted light 28c further passes through the wells 22 of the well array 21. The third diffracted light 28c produces evanescent waves through the wells 22. The evanescent waves excite biomolecules with fluorescent tags (not shown) loaded in the wells 22 to emit fluorescence light. In some embodiments, the wavelength of the second incident light 24b is in a range from about 380 nm to about 1,000 nm (i.e. from visible light to near infrared). In FIG. 3, the first diffracted light 28a of the first light 26a passing through the wells 22 intersects with the third diffracted light 28c of the second light 26b passing through the wells 22. Therefore, in FIG. 3, the biomolecules with fluorescent tags loaded in the wells 22 may be excited by light of different wavelengths (for example, two wavelengths of light) to produce different fluorescence emission light.

In some embodiments, the wavelength of the first incident light 24a is the same as that of the second incident light 24b. In some embodiments, the wavelengths of the first incident light 24a and the second incident light 24b are different. In some embodiments, the wavelength of the first incident light 24a may be 532 nm or 633 nm. In some embodiments, the wavelength of the second incident light 24b may be 532 nm or 633 nm.

In some embodiments, the substrate 12 may include a rigid substrate or a flexible substrate, for example, a glass substrate or a polyimide (PI) substrate.

In some embodiments, the refractive index of the waveguide layer 14 may be greater than that of the substrate 12. In some embodiments, the refractive index of the waveguide layer 14 is between 1.4 and 3.8.

In some embodiments, the period of the first input grating 16a and the second input grating 16b is in a range from about 0.1 μm to about 2 μm. For example, when the wavelength of the first incident light 24a is about 532 nm, the period of the first input grating 16a is about 300 nm. When the wavelength of the second incident light 24b is about 532 nm, and the second input grating 16b is about 300 nm.

In some embodiments, the first fold grating 18a and the second fold grating 18b may include a binary grating, a slanted grating, or a blazed grating. In some embodiments, the first fold grating 18a and the second fold grating 18b may be disposed in the top position of the waveguide layer 14. In some embodiments, the first fold grating 18a and the second fold grating 18b may be disposed in the bottom position of the waveguide layer 14. In some embodiments, the period of the first fold grating 18a and the second fold grating 18b is in a range from about 0.1 μm to about 2 μm. For example, when the wavelength of the first incident light 24a is about 532 nm, the period of the first fold grating 18a is about 212 nm. When the wavelength of the second incident light 24b is about 532 nm, the second fold grating 18b is about 212 nm. In some embodiments, the smallest width w1 of the first fold grating 18a is equal to the diameter of the spot (not shown) of the first light 26a. In some embodiments, the diameter of the spot of the first light 26a is in a range from about 1 μm to about 10 mm. In some embodiments, the smallest width w2 of the second fold grating 18b is equal to the diameter of the spot (not shown) of the second light 26b. In some embodiments, the diameter of the spot of the second light 26b is in a range from about 1 m to about 10 mm.

In some embodiments, the first diffracted light 28a of the first light 26a may include 2 to $10^6$ beams. In some embodiments, the third diffracted light 28c of the second light 26b may include 2 to $10^6$ beams.

In some embodiments, when the thickness of the waveguide layer 14 is greater than the critical thickness, since light travels in a predetermined direction in the waveguide layer 14, the wells 22 of the well array 21 are located in predetermined positions in the isolation layer 20 to allow the light to pass through the wells 22. For example, when the thickness of the waveguide layer 14 is greater than 500 nm, the wells 22 of the well array 21 are located in predetermined positions in the isolation layer 20. In some embodiments, when the thickness of the waveguide layer 14 is smaller than the critical thickness, since light is evenly distributed in the waveguide layer 14, the wells 22 of the well array 21 are located in random positions in the isolation layer 20. In this situation, the light can also pass through the wells 22. For example, when the thickness of the waveguide layer 14 is smaller than 200 nm, the wells 22 of the well array 21 are located in random positions in the isolation layer 20. The critical thickness is decided by the maximum thickness of the waveguide layer 14 where there is single mode propagation.

In some embodiments, the angle between the extension direction 16ae of the first input grating 16a and the extension direction 18ae of the first fold grating 18a is defined by angle α (i.e. the rotation angle of the first fold grating 18a). In some embodiments, the angle α is an acute angle ranging from 15 degrees to 75 degrees. For example, the angle α is about 45 degrees. In some embodiments, the period of the first fold grating 18a is equal to the period of the first input grating 16a multiplied by cos α.

In some embodiments, the angle between the extension direction 16be of the second input grating 16b and the extension direction 18be of the second fold grating 18b is defined by angle β (i.e. the rotation angle of the second fold grating 18b). In some embodiments, the angle β is an acute angle ranging from 15 degrees to 75 degrees. For example, the angle β is about 45 degrees. In some embodiments, the period of the second fold grating 18b is equal to the period of the second input grating 16b multiplied by cos β. The period, depth, shape (profile), and rotation angle of the first fold grating 18a and the second fold grating 18b are the same in some embodiments and different in others.

In FIG. 3, the angle between the first diffracted light 28a of the first light 26a and the third diffracted light 28c of the second light 26b is defined by angle γ. In some embodiments, the angle γ is an acute angle ranging from 15 degrees to 165 degrees. For example, the angle γ is about 90 degrees.

In some embodiments, the well array 21 includes a plurality of nano-scale or micro-scale wells 22 loaded with biomolecules with fluorescent tags (not shown). The bottom of the well 22 may be modified with chemical reagents that can grab biomolecules. The well 22 of the well array 21 includes an opening 26. In some embodiments, the opening 26 may be round from the top view, as shown in FIG. 3. In some embodiments, the size of the opening 26 is in a range from about 50 nm to about 1 mm. For example, the diameter d of the opening 26 is in a range from about 50 nm to about 1 mm. In some embodiments, the opening 26 may be square from the top view. The length or width of the opening 26 is in a range from about 50 nm to about 1 mm.

In some embodiments, the isolation layer 20 may include metal materials such as titanium (Ti), aluminum (Al), tungsten (W), gold (Au), silver (Ag), palladium (Pd), germanium (Ge), nickel (Ni), molybdenum (Mo) or platinum (Pt). In some embodiments, the isolation layer 20 may include dielectric materials such as silicon oxide, silicon nitride or silicon oxynitride.

Figure 4:
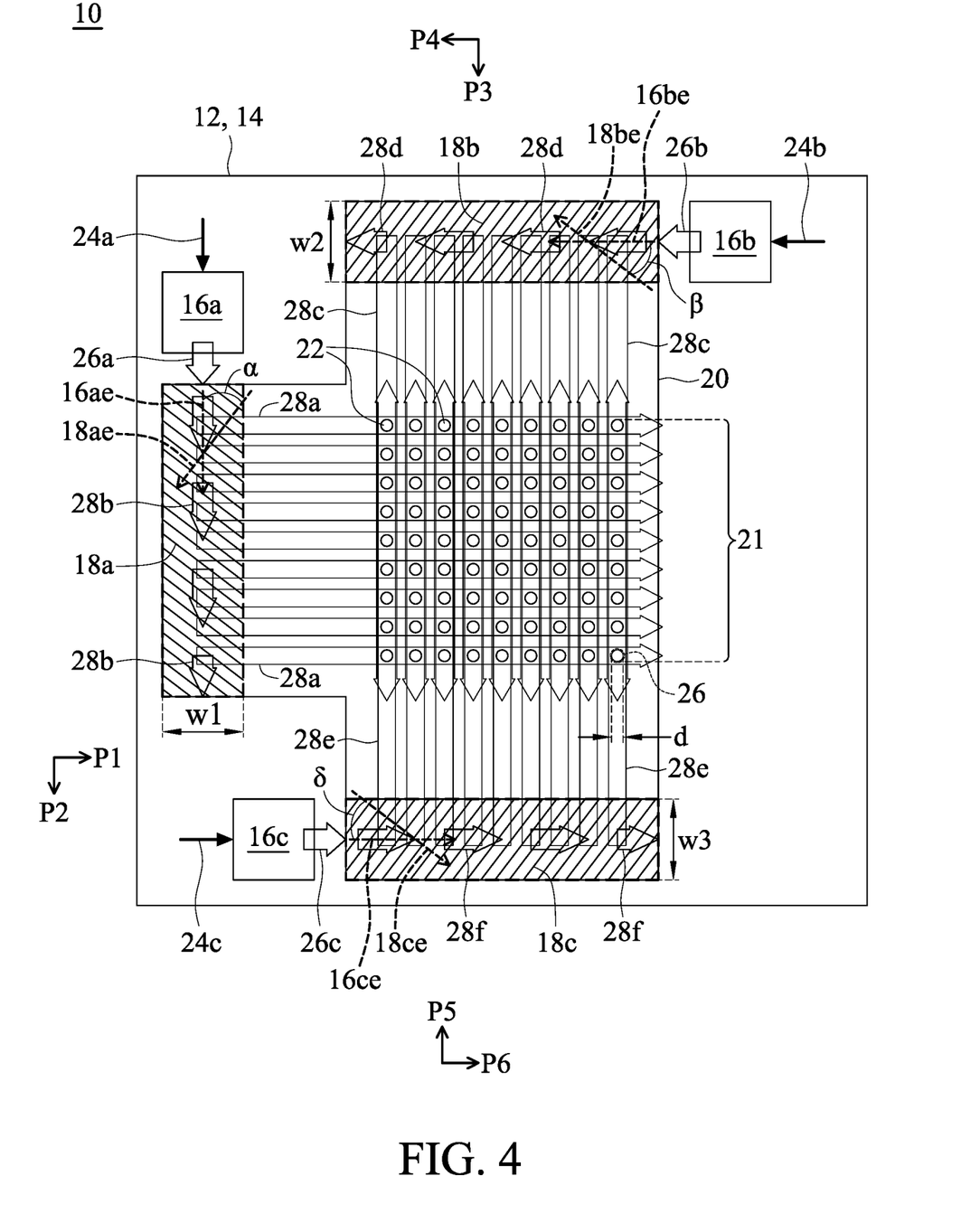
FIG. 4 shows a top view of an optical device in accordance with one embodiment of the present invention.

Referring to FIG. 4, in accordance with one embodiment of the present invention, an optical device 10 is provided. FIG. 4 shows a top view of the optical device 10. In the optical device 10, a substrate 12, a waveguide layer 14 and an isolation layer 20 are stacked like FIG. 1A, so that the cross-sectional view of the optical device 10 is omitted here.

As shown in FIG. 4, the optical device 10 includes a substrate 12, a waveguide layer 14, a first input grating 16a, a second input grating 16b, a third input grating 16c, a first fold grating 18a, a second fold grating 18b, a third fold grating 18c and an isolation layer 20. The waveguide layer 14 is disposed on the substrate 12. The first input grating 16a, the second input grating 16b and the third input grating 16c are disposed in the waveguide layer 14. The first fold grating 18a, the second fold grating 18b and the third fold grating 18c are disposed in the waveguide layer 14. The isolation layer 20 is disposed on the waveguide layer 14. The isolation layer 20 includes a well array 21 including a plurality of wells 22.

As shown in FIG. 4, a light path in the optical device 10 is further illustrated as follows. A first incident light 24a passes through the first input grating 16a to form a first light 26a. The first incident light 24a enters the first input grating 16a perpendicularly or at a proper angle of incidence. The path of the first light 26a is illustrated. The first light 26a passes through the first fold grating 18a to form a first diffracted light 28a in a first direction P1 and a second diffracted light 28b in a second direction P2. The first direction P1 is different from the second direction P2. When the first diffracted light 28a in the first direction P1 travels to a top portion corresponding to the well array 21 of the waveguide layer 14, the first diffracted light 28a further passes through the wells 22 of the well array 21. The first diffracted light 28a produces evanescent waves through the wells 22. The evanescent waves excite biomolecules with fluorescent tags (not shown) loaded in the wells 22 to emit fluorescence light. In some embodiments, the wavelength of the first incident light 24a is in a range from about 380 nm to about 1,000 nm (i.e. from visible light to near infrared).

A second incident light 24b passes through the second input grating 16b to form a second light 26b. The second incident light 24b enters the second input grating 16b perpendicularly or at a proper angle of incidence. The path of the second light 26b is illustrated. The second light 26b passes through the second fold grating 18b to form a third diffracted light 28c in a third direction P3 and a fourth diffracted light 28d in a fourth direction P4. The third direction P3 is different from the fourth direction P4. When the third diffracted light 28c in the third direction P3 travels to the top portion corresponding to the well array 21 of the waveguide layer 14, the third diffracted light 28c further passes through the wells 22 of the well array 21. The third diffracted light 28c produces evanescent waves through the wells 22. The evanescent waves excite biomolecules with fluorescent tags (not shown) loaded in the wells 22 to emit fluorescence light. In some embodiments, the wavelength of the second incident light 24b is in a range from about 380 nm to about 1,000 nm (i.e. from visible light to near infrared).

A third incident light 24c passes through the third input grating 16c to form a third light 26c. The third incident light 24c enters the third input grating 16c perpendicularly or at a proper angle of incidence. The path of the third light 26c is illustrated. The third light 26c passes through the third fold grating 18c to form a fifth diffracted light 28e in a fifth direction P5 and a sixth diffracted light 28f in a sixth direction P6. The fifth direction P5 is different from the sixth direction P6. When the fifth diffracted light 28e in the fifth direction P5 travels to the top portion corresponding to the well array 21 of the waveguide layer 14, the fifth diffracted light 28e further passes through the wells 22 of the well array 21. The fifth diffracted light 28e produces evanescent waves through the wells 22. The evanescent waves excite biomolecules with fluorescent tags (not shown) loaded in the wells 22 to emit fluorescence light. In some embodiments, the wavelength of the third incident light 24c is in a range from about 380 nm to about 1,000 nm (i.e. from visible light to near infrared). In FIG. 4, the first diffracted light 28a of the first light 26a passing through the wells 22 intersects with the third diffracted light 28c of the second light 26b passing through the wells 22 and the fifth diffracted light 28e of the third light 26c passing through the wells 22. Therefore, in FIG. 4, the biomolecules with fluorescent tags loaded in the wells 22 may be excited by light of different wavelengths (for example, three wavelengths of light) to produce different fluorescence.

In some embodiments, the wavelength of the first incident light 24a is the same as those of the second incident light 24b and the third incident light 24c. In some embodiments, the wavelengths of the first incident light 24a, the second incident light 24b and the third incident light 24c are different. In some embodiments, the wavelength of the first incident light 24a may be 488 nm, 532 nm or 633 nm. In some embodiments, the wavelength of the second incident light 24b may be 488 nm, 532 nm or 633 nm. In some embodiments, the wavelength of the third incident light 24c may be 488 nm, 532 nm or 633 nm.

In some embodiments, the substrate 12 may include a rigid substrate or a flexible substrate, for example, a glass substrate or a polyimide (PI) substrate.

In some embodiments, the refractive index of the waveguide layer 14 may be greater than that of the substrate 12. In some embodiments, the refractive index of the waveguide layer 14 is between 1.4 and 3.8.

In some embodiments, the period of the first input grating 16a, the second input grating 16b and the third input grating 16c is in a range from about 0.1 μm to about 2 μm. For example, when the wavelength of the first incident light 24a is about 532 nm, the period of the first input grating 16a is about 300 nm. When the wavelength of the second incident light 24b is about 532 nm, and the second input grating 16b is about 300 nm. When the wavelength of the third incident light 24c is about 532 nm, and the third input grating 16c is about 300 nm.

In some embodiments, the first fold grating 18a, the second fold grating 18b and the third fold grating 18c may include a binary grating, a slanted grating, or a blazed grating. In some embodiments, the first fold grating 18a, the second fold grating 18b and the third fold grating 18c may be disposed in the top position of the waveguide layer 14. In some embodiments, the first fold grating 18a, the second fold grating 18b and the third fold grating 18c may be disposed in the bottom position of the waveguide layer 14. In some embodiments, the period of the first fold grating 18a, the second fold grating 18b and the third fold grating 18c is in a range from about 0.1 μm to about 2 μm. For example, when the wavelength of the first incident light 24a is about 532 nm, the period of the first fold grating 18a is about 212 nm. When the wavelength of the second incident light 24b is about 532 nm, the second fold grating 18b is about 212 nm. When the wavelength of the third incident light 24c is about 532 nm, the third fold grating 18c is about 212 nm. In some embodiments, the smallest width w1 of the first fold grating 18a is equal to the diameter of the spot (not shown) of the first light 26a. In some embodiments, the diameter of the spot of the first light 26a is in a range from about 1 μm to about 10 mm. In some embodiments, the smallest width w2 of the second fold grating 18b is equal to the diameter of the spot (not shown) of the second light 26b. In some embodiments, the diameter of the spot of the second light 26b is in a range from about 1 μm to about 10 mm. In some embodiments, the smallest width w3 of the third fold grating 18c is equal to the diameter of the spot (not shown) of the third light 26c. In some embodiments, the diameter of the spot of the third light 26c is in a range from about 1 μm to about 10 mm.

In some embodiments, the first diffracted light 28a of the first light 26a may include 2 to $10^6$ beams. In some embodiments, the third diffracted light 28c of the second light 26b may include 2 to $10^6$ beams. In some embodiments, the fifth diffracted light 28e of the third light 26c may include 2 to $10^6$ beams.

In some embodiments, when the thickness of the waveguide layer 14 is greater than the critical thickness, since light travels in a predetermined direction in the waveguide layer 14, the wells 22 of the well array 21 are located in predetermined positions in the isolation layer 20 to allow the light to pass through the wells 22. For example, when the thickness of the waveguide layer 14 is greater than 500 nm, the wells 22 of the well array 21 are located in predetermined positions in the isolation layer 20. In some embodiments, when the thickness of the waveguide layer 14 is smaller than the critical thickness, since light is evenly distributed in the waveguide layer 14, the wells 22 of the well array 21 are located in random positions in the isolation layer 20. In this situation, the light can also pass through the wells 22. For example, when the thickness of the waveguide layer 14 is smaller than 200 nm, the wells 22 of the well array 21 are located in random positions in the isolation layer 20. The critical thickness is decided by the maximum thickness of the waveguide layer 14 where there is single mode propagation.

In some embodiments, the angle between the extension direction 16ae of the first input grating 16a and the extension direction 18ae of the first fold grating 18a is defined by angle α (i.e. the rotation angle of the first fold grating 18a). In some embodiments, the angle α is an acute angle ranging from 15 degrees to 75 degrees. For example, the angle α is about 45 degrees. In some embodiments, the period of the first fold grating 18a is equal to the period of the first input grating 16a multiplied by cos α.

In some embodiments, the angle between the extension direction 16be of the second input grating 16b and the extension direction 18be of the second fold grating 18b is defined by angle β (i.e. the rotation angle of the second fold grating 18b). In some embodiments, the angle β is an acute angle ranging from 15 degrees to 75 degrees. For example, the angle β is about 45 degrees. In some embodiments, the period of the second fold grating 18b is equal to the period of the second input grating 16b multiplied by cos β.

In some embodiments, the angle between the extension direction 16ce of the third input grating 16c and the extension direction 18ce of the third fold grating 18c is defined by angle δ (i.e. the rotation angle of the third fold grating 18c). In some embodiments, the angle δ is an acute angle ranging from 15 degrees to 75 degrees. For example, the angle δ is about 45 degrees. In some embodiments, the period of the third fold grating 18c is equal to the period of the third input grating 16c multiplied by cos δ. In some embodiments, the first fold grating 18a, the second fold grating 18b, and the third fold grating 18c all have the same period, depth, shape (profile), and rotation angle. In some embodiments, the first fold grating 18a, the second fold grating 18b, and the third fold grating 18c each have a different period, depth, shape (profile), and rotation angle.

In some embodiments, the well array 21 includes a plurality of nano-scale or micro-scale wells 22 loaded with biomolecules with fluorescent tags (not shown). The bottom of the well 22 may be modified with chemical reagents that can grab biomolecules. The well 22 of the well array 21 includes an opening 26. In some embodiments, the opening 26 may be round from the top view, as shown in FIG. 4. In some embodiments, the size of the opening 26 is in a range from about 50 nm to about 1 mm. For example, the diameter d of the opening 26 is in a range from about 50 nm to about 1 mm. In some embodiments, the opening 26 may be square from the top view. The length or width of the opening 26 is in a range from about 50 nm to about 1 mm.

In some embodiments, the isolation layer 20 may include metal materials such as titanium (Ti), aluminum (Al), tungsten (W), gold (Au), silver (Ag), palladium (Pd), germanium (Ge), nickel (Ni), molybdenum (Mo) or platinum (Pt). In some embodiments, the isolation layer 20 may include dielectric materials such as silicon oxide, silicon nitride or silicon oxynitride.

Figure 5:
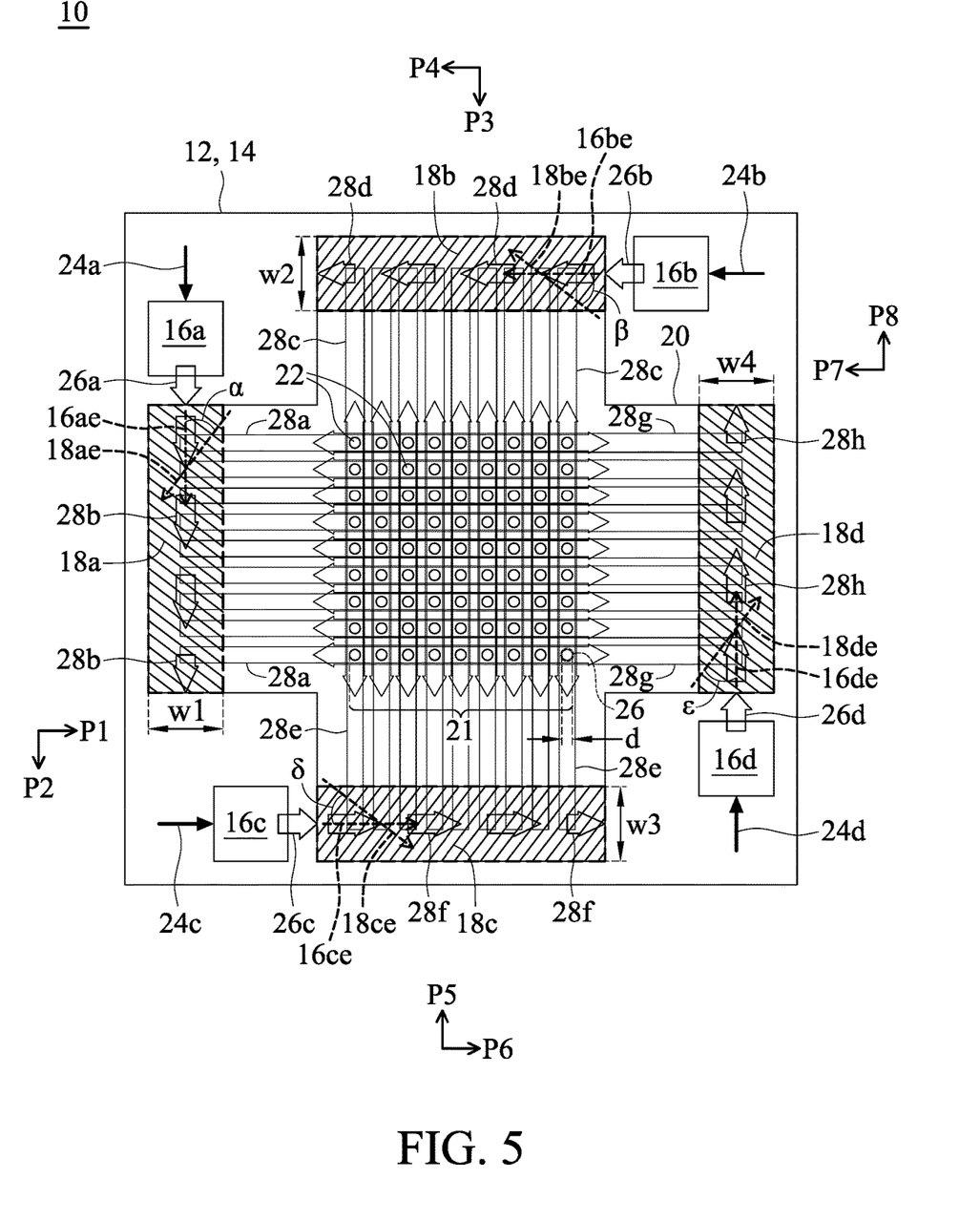
FIG. 5 shows a top view of an optical device in accordance with one embodiment of the present invention.

Referring to FIG. 5, in accordance with one embodiment of the present invention, an optical device 10 is provided. FIG. 5 shows a top view of the optical device 10. In the optical device 10, a substrate 12, a waveguide layer 14 and an isolation layer 20 are stacked like FIG. 1A, so that the cross-sectional view of the optical device 10 is omitted here.

As shown in FIG. 5, the optical device 10 includes a substrate 12, a waveguide layer 14, a first input grating 16a, a second input grating 16b, a third input grating 16c, a fourth input grating 16d, a first fold grating 18a, a second fold grating 18b, a third fold grating 18c, a fourth fold grating 18d and an isolation layer 20. The waveguide layer 14 is disposed on the substrate 12. The first input grating 16a, the second input grating 16b, the third input grating 16c and the fourth input grating 16d are disposed in the waveguide layer 14. The first fold grating 18a, the second fold grating 18b, the third fold grating 18c and the fourth fold grating 18d are disposed in the waveguide layer 14. The isolation layer 20 is disposed on the waveguide layer 14. The isolation layer 20 includes a well array 21 including a plurality of wells 22.

As shown in FIG. 5, a light path in the optical device 10 is further illustrated as follows. A first incident light 24a passes through the first input grating 16a to form a first light 26a. The first incident light 24a enters the first input grating 16a perpendicularly or at a proper angle of incidence. The path of the first light 26a is illustrated. The first light 26a passes through the first fold grating 18a to form a first diffracted light 28a in a first direction P1 and a second diffracted light 28b in a second direction P2. The first direction P1 is different from the second direction P2. When the first diffracted light 28a in the first direction P1 travels to a top portion corresponding to the well array 21 of the waveguide layer 14, the first diffracted light 28a further passes through the wells 22 of the well array 21. The first diffracted light 28a produces evanescent waves through the wells 22. The evanescent waves excite biomolecules with fluorescent tags (not shown) loaded in the wells 22 to emit fluorescence light. In some embodiments, the wavelength of the first incident light 24a is in a range from about 380 nm to about 1,000 nm (i.e. from visible light to near infrared).

A second incident light 24b passes through the second input grating 16b to form a second light 26b. The second incident light 24b enters the second input grating 16b perpendicularly or at a proper angle of incidence. The path of the second light 26b is illustrated. The second light 26b passes through the second fold grating 18b to form a third diffracted light 28c in a third direction P3 and a fourth diffracted light 28d in a fourth direction P4. The third direction P3 is different from the fourth direction P4. When the third diffracted light 28c in the third direction P3 travels to the top portion corresponding to the well array 21 of the waveguide layer 14, the third diffracted light 28c further passes through the wells 22 of the well array 21. The third diffracted light 28c produces evanescent waves through the wells 22. The evanescent waves excite biomolecules with fluorescent tags (not shown) loaded in the wells 22 to emit fluorescence light. In some embodiments, the wavelength of the second incident light 24b is in a range from about 380 nm to about 1,000 nm (i.e. from visible light to near infrared).

A third incident light 24c passes through the third input grating 16c to form a third light 26c. The third incident light 24c enters the third input grating 16c perpendicularly or at a proper angle of incidence. The path of the third light 26c is illustrated. The third light 26c passes through the third fold grating 18c to form a fifth diffracted light 28e in a fifth direction P5 and a sixth diffracted light 28f in a sixth direction P6. The fifth direction P5 is different from the sixth direction P6. When the fifth diffracted light 28e in the fifth direction P5 travels to the top portion corresponding to the well array 21 of the waveguide layer 14, the fifth diffracted light 28e further passes through the wells 22 of the well array 21. The fifth diffracted light 28e produces evanescent waves through the wells 22. The evanescent waves excite biomolecules with fluorescent tags (not shown) loaded in the wells 22 to emit fluorescence light. In some embodiments, the wavelength of the third incident light 24c is in a range from about 380 nm to about 1,000 nm (i.e. from visible light to near infrared).

A fourth incident light 24d passes through the fourth input grating 16d to form a fourth light 26d. The fourth incident light 24d enters the fourth input grating 16d perpendicularly or at a proper angle of incidence. The path of the fourth light 26d is illustrated. The fourth light 26d passes through the fourth fold grating 18d to form a seventh diffracted light 28g in a seventh direction P7 and an eighth diffracted light 28h in an eighth direction P8. The seventh direction P7 is different from the eighth direction P8. When the seventh diffracted light 28g in the seventh direction P7 travels to the top portion corresponding to the well array 21 of the waveguide layer 14, the seventh diffracted light 28g further passes through the wells 22 of the well array 21. The seventh diffracted light 28g produces evanescent waves through the wells 22. The evanescent waves excite biomolecules with fluorescent tags (not shown) loaded in the wells 22 to emit fluorescence light. In some embodiments, the wavelength of the fourth incident light 24d is in a range from about 380 nm to about 1,000 nm (i.e. from visible light to near infrared). In FIG. 5, the first diffracted light 28a of the first light 26a passing through the wells 22 intersects with the third diffracted light 28c of the second light 26b passing through the wells 22, the fifth diffracted light 28e of the third light 26c passing through the wells 22, and the seventh diffracted light 28g of the fourth light 26d passing through the wells 22. Therefore, in FIG. 5, the biomolecules with fluorescent tags loaded in the wells 22 may be excited by light of different wavelengths (for example, four wavelengths of light) to produce different fluorescence.

In some embodiments, the wavelength of the first incident light 24a is the same as those of the second incident light 24b, the third incident light 24c and the fourth incident light 24d. In some embodiments, the wavelengths of the first incident light 24a, the second incident light 24b, the third incident light 24c and the fourth incident light 24d are different. In some embodiments, the wavelength of the first incident light 24a may be 460 nm, 520 nm, 633 nm or 671 nm. In some embodiments, the wavelength of the second incident light 24b may be 460 nm, 520 nm, 633 nm or 671 nm. In some embodiments, the wavelength of the third incident light 24c may be 460 nm, 520 nm, 633 nm or 671 nm. In some embodiments, the wavelength of the fourth incident light 24d may be 460 nm, 520 nm, 633 nm or 671 nm.

In some embodiments, the substrate 12 may include a rigid substrate or a flexible substrate, for example, a glass substrate or a polyimide (PI) substrate.

In some embodiments, the refractive index of the waveguide layer 14 may be greater than that of the substrate 12. In some embodiments, the refractive index of the waveguide layer 14 is between 1.4 and 3.8.

In some embodiments, the period of the first input grating 16a, the second input grating 16b, the third input grating 16c and the fourth input grating 16d is in a range from about 0.1 μm to about 2 μm. For example, when the wavelength of the first incident light 24a is about 532 nm, the period of the first input grating 16a is about 300 nm. When the wavelength of the second incident light 24b is about 532 nm, and the second input grating 16b is about 300 nm. When the wavelength of the third incident light 24c is about 532 nm, and the third input grating 16c is about 300 nm. When the wavelength of the fourth incident light 24d is about 532 nm, and the fourth input grating 16d is about 300 nm.

In some embodiments, the first fold grating 18a, the second fold grating 18b, the third fold grating 18c and the fourth fold grating 18d may include a binary grating, a slanted grating, or a blazed grating. In some embodiments, the first fold grating 18a, the second fold grating 18b, the third fold grating 18c and the fourth fold grating 18d may be disposed in the top position of the waveguide layer 14. In some embodiments, the first fold grating 18a, the second fold grating 18b, the third fold grating 18c and the fourth fold grating 18d may be disposed in the bottom position of the waveguide layer 14. In some embodiments, the period of the first fold grating 18a, the second fold grating 18b, the third fold grating 18c and the fourth fold grating 18d is in a range from about 0.1 μm to about 2 μm. For example, when the wavelength of the first incident light 24a is about 532 nm, the period of the first fold grating 18a is about 212 nm. When the wavelength of the second incident light 24b is about 532 nm, the second fold grating 18b is about 212 nm. When the wavelength of the third incident light 24c is about 532 nm, the third fold grating 18c is about 212 nm. When the wavelength of the fourth incident light 24d is about 532 nm, the fourth fold grating 18d is about 212 nm. In some embodiments, the smallest width w1 of the first fold grating 18a is equal to the diameter of the spot (not shown) of the first light 26a. In some embodiments, the diameter of the spot of the first light 26a is in a range from about 1 μm to about 10 mm. In some embodiments, the smallest width w2 of the second fold grating 18b is equal to the diameter of the spot (not shown) of the second light 26b. In some embodiments, the diameter of the spot of the second light 26b is in a range from about 1 m to about 10 mm. In some embodiments, the smallest width w3 of the third fold grating 18c is equal to the diameter of the spot (not shown) of the third light 26c. In some embodiments, the diameter of the spot of the third light 26c is in a range from about 1 μm to about 10 mm. In some embodiments, the smallest width w4 of the fourth fold grating 18d is equal to the diameter of the spot (not shown) of the fourth light 26d. In some embodiments, the diameter of the spot of the fourth light 26d is in a range from about 1 μm to about 10 mm.

In some embodiments, the first diffracted light 28a of the first light 26a may include 2 to $10^6$ beams. In some embodiments, the third diffracted light 28c of the second light 26b may include 2 to $10^6$ beams. In some embodiments, the fifth diffracted light 28e of the third light 26c may include 2 to $10^6$ beams. In some embodiments, the seventh diffracted light 28g of the fourth light 26d may include 2 to $10^6$ beams.

In some embodiments, when the thickness of the waveguide layer 14 is greater than the critical thickness, since light travels in a predetermined direction in the waveguide layer 14, the wells 22 of the well array 21 are located in predetermined positions in the isolation layer 20 to allow the light to pass through the wells 22. For example, when the thickness of the waveguide layer 14 is greater than 500 nm, the wells 22 of the well array 21 are located in predetermined positions in the isolation layer 20. In some embodiments, when the thickness of the waveguide layer 14 is smaller than the critical thickness, since light is evenly distributed in the waveguide layer 14, the wells 22 of the well array 21 are located in random positions in the isolation layer 20. In this situation, the light can also pass through the wells 22. For example, when the thickness of the waveguide layer 14 is smaller than 200 nm, the wells 22 of the well array 21 are located in random positions in the isolation layer 20. The critical thickness is decided by the maximum thickness of the waveguide layer 14 where there is single mode propagation.

In some embodiments, the angle between the extension direction 16ae of the first input grating 16a and the extension direction 18ae of the first fold grating 18a is defined by angle α (i.e. the rotation angle of the first fold grating 18a). In some embodiments, the angle α is an acute angle ranging from 15 degrees to 75 degrees. For example, the angle α is about 45 degrees. In some embodiments, the period of the first fold grating 18a is equal to the period of the first input grating 16a multiplied by cos α.

In some embodiments, the angle between the extension direction 16be of the second input grating 16b and the extension direction 18be of the second fold grating 18b is defined by angle β (i.e. the rotation angle of the second fold grating 18b). In some embodiments, the angle β is an acute angle ranging from 15 degrees to 75 degrees. For example, the angle β is about 45 degrees. In some embodiments, the period of the second fold grating 18b is equal to the period of the second input grating 16b multiplied by cos β.

In some embodiments, the angle between the extension direction 16ce of the third input grating 16c and the extension direction 18ce of the third fold grating 18c is defined by angle δ (i.e. the rotation angle of the third fold grating 18c). In some embodiments, the angle δ is an acute angle ranging from 15 degrees to 75 degrees. For example, the angle δ is about 45 degrees. In some embodiments, the period of the third fold grating 18c is equal to the period of the third input grating 16c multiplied by cos δ.

In some embodiments, the angle between the extension direction 16de of the fourth input grating 16d and the extension direction 18de of the fourth fold grating 18d is defined by angle F (i.e. the rotation angle of the fourth fold grating 18d). In some embodiments, the angle F is an acute angle ranging from 15 degrees to 75 degrees. For example, the angle F is about 45 degrees. In some embodiments, the period of the fourth fold grating 18d is equal to the period of the fourth input grating 16d multiplied by cos F. In some embodiments, the first fold grating 18a, the second fold grating 18b, the third fold grating 18c, and the fourth fold grating 18d all have the same period, depth, shape (profile), and rotation angle. In some embodiments, the period, depth, shape (profile), and rotation angle of the first fold grating 18a, the second fold grating 18b, the third fold grating 18c, and the fourth fold grating 18d are different.

In some embodiments, the well array 21 includes a plurality of nano-scale or micro-scale wells 22 loaded with biomolecules with fluorescent tags (not shown). The bottom of the well 22 may be modified with chemical reagents that can grab biomolecules. The well 22 of the well array 21 includes an opening 26. In some embodiments, the opening 26 may be round from the top view, as shown in FIG. 5. In some embodiments, the size of the opening 26 is in a range from about 50 nm to about 1 mm. For example, the diameter d of the opening 26 is in a range from about 50 nm to about 1 mm. In some embodiments, the opening 26 may be square from the top view. The length or width of the opening 26 is in a range from about 50 nm to about 1 mm.

In some embodiments, the isolation layer 20 may include metal materials such as titanium (Ti), aluminum (Al), tungsten (W), gold (Au), silver (Ag), palladium (Pd), germanium (Ge), nickel (Ni), molybdenum (Mo) or platinum (Pt). In some embodiments, the isolation layer 20 may include dielectric materials such as silicon oxide, silicon nitride or silicon oxynitride.

The present invention provides a bio-detection device using at least one fold grating on a planar waveguide layer to equally split excitation energy for the detection of fluorescence molecules in the reaction sites. The device provided by the present invention needs a short width to include a fold grating for equally splitting excitation energy into the waveguide layer. In addition, the biomolecules with fluorescent tags to be detected loaded in each well are excited by light of different wavelengths (for example, two, three or four wavelengths of light) to produce different fluorescence.

Although some embodiments of the present invention and their advantages have been described in detail, it should be understood that various changes, substitutions and alterations can be made herein without departing from the spirit and scope of the invention as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and operations described in the specification. As one of ordinary skill in the art will readily appreciate from the disclosure of the present disclosure, processes, machines, manufacture, compositions of matter, means, methods, or operations, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or operations.

What is claimed is:

1. An optical device, comprising:
    a substrate;
    a waveguide layer disposed on the substrate;
    a first input grating disposed in the waveguide layer, wherein a first incident light passes through the first input grating to form a first light;
    a first fold grating disposed in the waveguide layer, wherein the first light passes through the first fold grating to form a first diffracted light in a first direction and a second diffracted light in a second direction, and the first direction is different from the second direction;
    an isolation layer having a first well array having wells disposed on the waveguide layer, wherein when the first diffracted light in the first direction travels to a first top portion corresponding to the first well array of the waveguide layer, the first diffracted light further passes through the first well array;
    a second fold grating disposed in the waveguide layer on a side of the first input grating opposite the side that is facing the first fold grating, wherein the first incident light passes through the first input grating to form a second light, the second light passes through the second fold grating to form a third diffracted light in a third direction and a fourth diffracted light in a fourth direction, the third direction is different from the fourth direction, and when the third diffracted light in the third direction travels to a second top portion corresponding to a second well array of the waveguide layer, the third diffracted light further passes through the second well array.

2. The optical device as claimed in claim 1, wherein the waveguide layer has a refractive index greater than a refractive index of the substrate, and the refractive index of the waveguide layer is between 1.4 and 3.8.

3. The optical device as claimed in claim 1, wherein the first input grating has a period of 0.1 μm to 2 μm, and the first fold grating has a period of 0.1 μm to 2 μm.

4. The optical device as claimed in claim 1, wherein the first fold grating comprises a binary grating, a slanted grating, or a blazed grating.

5. The optical device as claimed in claim 1, wherein the first fold grating is disposed in a top position or a bottom position of the waveguide layer.

6. The optical device as claimed in claim 1, wherein the first fold grating has a width that is equal to or larger than a diameter of a spot of the first light, and the diameter of the spot of the first light is between 1 μm and 10 mm.

7. The optical device as claimed in claim 1, wherein the first diffracted light comprises 2 to 106 beams.

8. The optical device as claimed in claim 1, wherein the first incident light has a wavelength in a range from 380 nm to 1000 nm.

9. The optical device as claimed in claim 1, wherein the waveguide layer has a thickness, when the thickness is greater than a critical thickness, the wells are located in predetermined positions in the isolation layer, wherein the predetermined positions are configured to allow the first light to pass through the wells, and when the thickness is smaller than the critical thickness, the wells are located in random positions in the isolation layer, wherein the critical thickness is a maximum thickness of the waveguide layer where there is single mode propagation.

10. The optical device as claimed in claim 1, wherein the first input grating has an extension direction, the first fold grating has an extension direction, an angle between the extension direction of the first input grating and the extension direction of the first fold grating is equal to $\alpha$, and the angle $\alpha$ is greater than 15 degrees and smaller than 75 degrees.

11. The optical device as claimed in claim 10, wherein the first fold grating has a period that is equal to a period of the first input grating multiplied by $\cos \alpha$.

12. The optical device as claimed in claim 1, wherein the first well array comprises a plurality of nano-scale or micro-scale wells loaded with biomolecules with fluorescent tags.

13. The optical device as claimed in claim 1, wherein each of the wells has an opening which has a shape that is round or square from a top view with a size from 50 nm to 1 mm, and the isolation layer comprises metal materials or dielectric materials.

14. The optical device, comprising:
a substrate;
a waveguide layer disposed on the substrate;
a first input grating disposed in the waveguide layer, wherein a first incident light passes through the first input grating to form a first light;
a first fold grating disposed in the waveguide layer, wherein the first light passes through the first fold grating to form a first diffracted light in a first direction and a second diffracted light in a second direction, and the first direction is different from the second direction;
an isolation layer having a first well array having wells disposed on the waveguide layer, wherein when the first diffracted light in the first direction travels to a first top portion corresponding to the first well array of the waveguide layer, the first diffracted light further passes through the first well array;
a second input grating disposed in the waveguide layer; and
a second fold grating disposed in the waveguide layer,
wherein a second incident light passes through the second input grating to form a second light, the second light passes through the second fold grating to form a third diffracted light in a third direction and a fourth diffracted light in a fourth direction, the third direction is different from the fourth direction, and when the third diffracted light in the third direction travels to the first top portion corresponding to the first well array of the waveguide layer, the third diffracted light further passes through the first well array.

15. The optical device as claimed in claim 14, wherein the first diffracted light of the first light passing through the first well array intersects with the third diffracted light of the second light passing through the first well array.

16. The optical device as claimed in claim 15, further comprising a third input grating and a third fold grating which are disposed in the waveguide layer, wherein a third incident light passes through the third input grating to form a third light, the third light passes through the third fold grating to form a fifth diffracted light in a fifth direction and a sixth diffracted light in a sixth direction, the fifth direction is different from the sixth direction, and when the fifth diffracted light in the fifth direction travels to the first top portion corresponding to the first well array of the waveguide layer, the fifth diffracted light further passes through the first well array.

17. The optical device as claimed in claim 16, wherein the fifth diffracted light of the third light passing through the first well array.

18. The optical device as claimed in claim 17, further comprising a fourth input grating and a fourth fold grating which are disposed in the waveguide layer, wherein a fourth incident light passes through the fourth input grating to form a fourth light, the fourth light passes through the fourth fold grating to form a seventh diffracted light in a seventh direction and an eighth diffracted light in an eighth direction, the seventh direction is different from the eighth direction, and when the seventh diffracted light in the seventh direction travels to the first top portion corresponding to the first well array of the waveguide layer, the seventh diffracted light further passes through the first well array.

19. The optical device as claimed in claim 18, wherein and the seventh diffracted light of the fourth light passing through the first well array.

* * * * *